(12) United States Patent
Scheffler et al.

(10) Patent No.: US 8,464,665 B1
(45) Date of Patent: Jun. 18, 2013

(54) PET TOY CONVERTIBLE BETWEEN A BONE SHAPE AND A BALL SHAPE

(76) Inventors: Keith Scheffler, Fenton, MO (US); Simeon E. Tiefel, Stevensville, MT (US)

( * ) Notice: Subject to any disclaimer, the term of this patent is extended or adjusted under 35 U.S.C. 154(b) by 133 days.

(21) Appl. No.: 12/353,249

(22) Filed: Jan. 13, 2009

(51) Int. Cl.
*A01K 29/00* (2006.01)

(52) U.S. Cl.
USPC .......................................... 119/709; 119/707

(58) Field of Classification Search
USPC .. 119/702, 707, 709, 710, 711, 708; D30/160; 473/577, 595; 446/71–73, 75–78, 321, 487
IPC ...................................................... A01K 29/00
See application file for complete search history.

(56) References Cited

U.S. PATENT DOCUMENTS

| | | | | |
|---|---|---|---|---|
| 503,387 A * | 8/1893 | Schofield | | 473/576 |
| 600,610 A * | 3/1898 | Cowles | | 434/213 |
| 3,368,528 A | 2/1968 | Gange | | |
| 5,090,569 A * | 2/1992 | Nissen et al. | | 206/457 |
| 5,673,653 A | 10/1997 | Sherrill | | |
| 5,797,815 A * | 8/1998 | Goldman et al. | | 473/588 |
| 6,050,224 A * | 4/2000 | Owens | | 119/710 |
| D441,407 S * | 5/2001 | Goldman | | D21/398 |
| 6,305,326 B1 | 10/2001 | Suchowski et al. | | |
| 6,405,681 B1 * | 6/2002 | Ward | | 119/707 |
| 6,502,657 B2 * | 1/2003 | Kerrebrock et al. | | 180/218 |
| 6,584,938 B2 | 7/2003 | Sherrill et al. | | |
| 6,863,588 B1 * | 3/2005 | Chu | | 446/487 |
| D503,507 S * | 4/2005 | Jia et al. | | D1/199 |
| 6,899,059 B1 * | 5/2005 | Crane et al. | | 119/711 |
| D529,967 S * | 10/2006 | Bowen et al. | | D21/533 |
| 7,217,170 B2 * | 5/2007 | Moll et al. | | 446/164 |
| 7,278,374 B2 * | 10/2007 | Mann | | 119/710 |
| D566,788 S * | 4/2008 | Pasko | | D21/533 |
| 7,500,450 B2 * | 3/2009 | Wolfe et al. | | 119/709 |
| 7,694,653 B2 * | 4/2010 | Axelrod | | 119/709 |
| 7,794,300 B2 * | 9/2010 | Moll et al. | | 446/164 |
| 7,803,033 B1 * | 9/2010 | Walterscheid | | 446/486 |
| 2009/0124164 A1 * | 5/2009 | Willett | | 446/154 |
| 2010/0326368 A1 * | 12/2010 | Tsengas | | 119/707 |

\* cited by examiner

*Primary Examiner* — David J Parsley
*Assistant Examiner* — Thien Thanh Pham
(74) *Attorney, Agent, or Firm* — LaMorte & Associates, P.C.

(57) ABSTRACT

A chew toy assembly that is selectively convertible between a ball configuration and a bone configuration. The chew toy assembly has two invertible structures that are disposed at opposite ends of an elongated body. Each of the invertible structures is selectively configured between a hemispherical shape and a funnel shape by physical manipulation, wherein each invertible structure has a central hub. When the invertible structures are in their hemispherical shapes, the invertible structures form a ball around the elongated body. Alternatively, when the invertible structures are in their funnel shapes, the invertible structures diverge away from the elongated body in opposite directions, therein forming a bone configuration.

14 Claims, 4 Drawing Sheets

PET TOY CONVERTIBLE BETWEEN A BONE SHAPE AND A BALL SHAPE

BACKGROUND OF THE INVENTION

1. Field of the Invention

In general, the present invention relates to pet toys. More particularly, the present invention relates to pet toys that can be configured into different shapes.

2. Prior Art Description

Dogs have been domesticated since before the beginning of recorded history. Once dogs became domesticated, it became the responsibility of the dog's owner to provide food for the dog.

Dogs are carnivores. Accordingly, the diet appropriate for a dog is mostly meat. However, dogs do have other requirements in order to maintain good health. Dogs instinctively gnaw on bones, animal hide and other hard animal parts. The purpose of such gnawing is not to obtain sustenance, but rather to clean, sharpen and strengthen the teeth of the dog.

In modern times, dogs are fed with commercially processed food which is typically derived from animal byproducts. Such foods satisfy the nutritional requirements of a dog. However, such foods do not satisfy the dog's instinct to gnaw. It is for this reason that many dog owners buy chew toys for their dogs. The chew toy satisfies the dog's instinct to gnaw, thereby providing beneficial effects to the dog's teeth.

In the prior art, there are numerous chew toys for dogs. Dog chew toys span the range from knotted ropes to molded plastic balls. Many chew toys are made completely from synthetic materials, such as plastic. These chew toys are never consumed and have an indefinite life. Such prior art chew toys are exemplified by U.S. Pat. No. 6,305,326 to Suchowski, entitled Composite Chew Toy. A problem with such synthetic chew toys is that they rarely provide lasting interest to a dog. A dog, therefore, may not often chew on the toy and therefore does not benefit from the chew toy.

Dogs find chew toys made of rawhide and similar natural materials to be more interesting. A chew toy made of rawhide will slowly wear away as a dog gnaws upon it. Chew toys made of rawhide are exemplified by U.S. Pat. No. 3,368,528 to Gange, entitled Simulated Dog-Bone And Method Of Making Thereof. Chew toys made of material, such as rawhide, tend to become soft and harbor bacteria. Furthermore, such chew toys become small over time and eventually become a choking hazard to the dog.

In order to solve the problems associated with plastic and rawhide chew toys, hybrid chew toys have been developed that combine edible inserts with non-edible components. Such prior art chew toys are exemplified by U.S. Pat. No. 5,673,653 to Sherrill, entitled Chew Toy For Domestic Carnivorous Animals And Method For Making Same, and U.S. Pat. No. 6,584,938 to Sherill, entitled Dog Bone With Jerky Pieces And Method For Making. The largest problem with such prior art chew toys is that the edible material is manufactured into the structure of the chew toy and cannot be replaced. Accordingly, once the edible material is spent, a dog will lose interest in the chew toy.

A need therefore exists for a synthetic chew toy that can hold edible material, wherein the edible material can be replaced once spent. The need also exists for a chew toy, whose configuration is appealing to a dog, so as to be interesting to a dog even when the edible material is not present. These needs are met by the present invention as described and claimed below.

SUMMARY OF THE INVENTION

The present invention is a chew toy assembly that is selectively convertible between a ball configuration and a bone configuration. The chew toy assembly has two invertible structures that are disposed at opposite ends of an elongated body. Each of the invertible structures is selectively configured between a hemispherical shape and a funnel shape by physical manipulation.

When the invertible structures are in their hemispherical shapes, the invertible structures form a ball around the elongated body. Alternatively, when the invertible structures are in their funnel shapes, the invertible structures diverge away from the elongated body in opposite directions, therein forming a bone configuration.

When the chew toy assembly is in its ball configuration, edible treats can be stored within the ball configuration to make the chew toy more interesting to a dog. Edible treats can also be stored within the elongated body that extends between the invertible structures.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention chew toy can be embodied in many ways, the embodiment illustrated shows the chew toy being convertible between a bone configuration and a ball configuration. This embodiment is selected in order to set forth the best mode contemplated for the invention. The illustrated embodiment, however, is merely exemplary and should not be considered a limitation when interpreting the scope of the appended claims.

Figure 1:
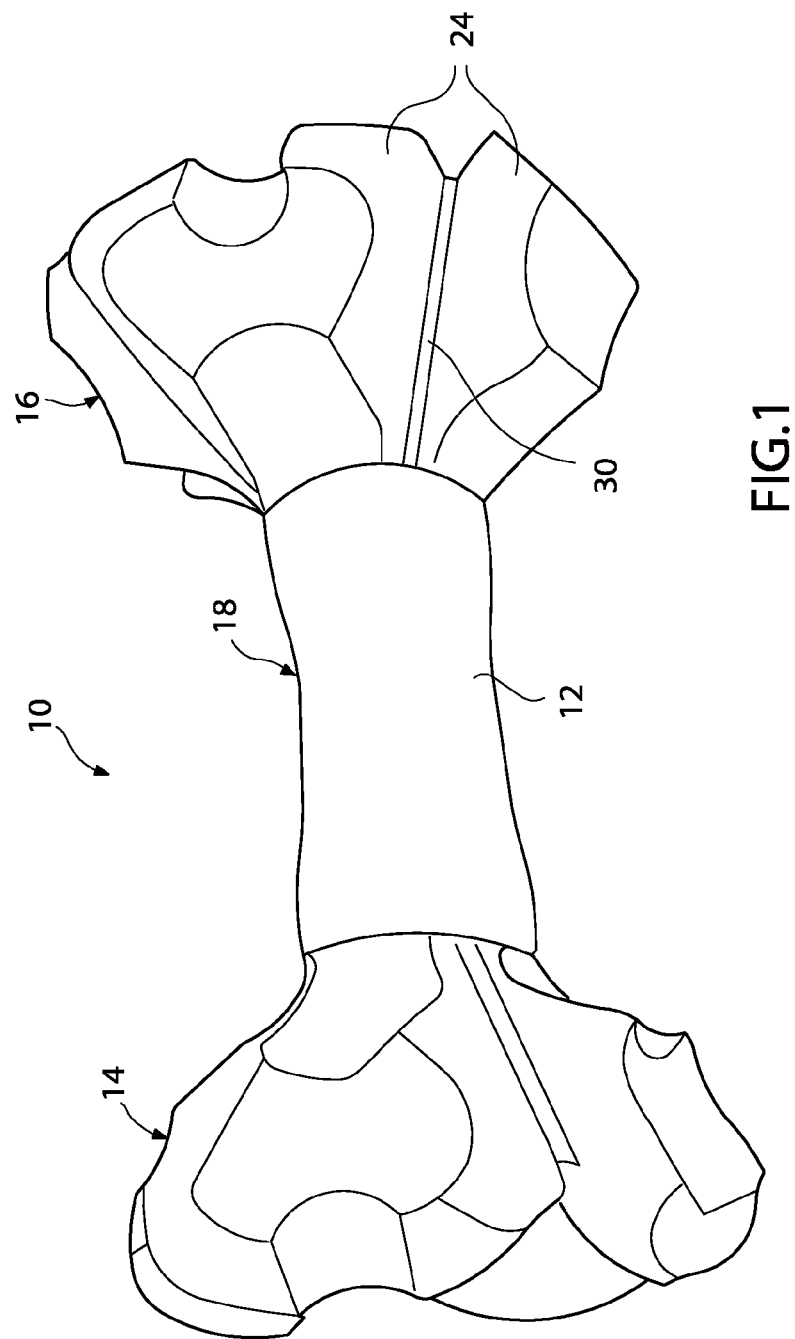
FIG. 1 is a perspective view of an exemplary embodiment of a chew toy assembly in its bone configuration.
Figure 2:
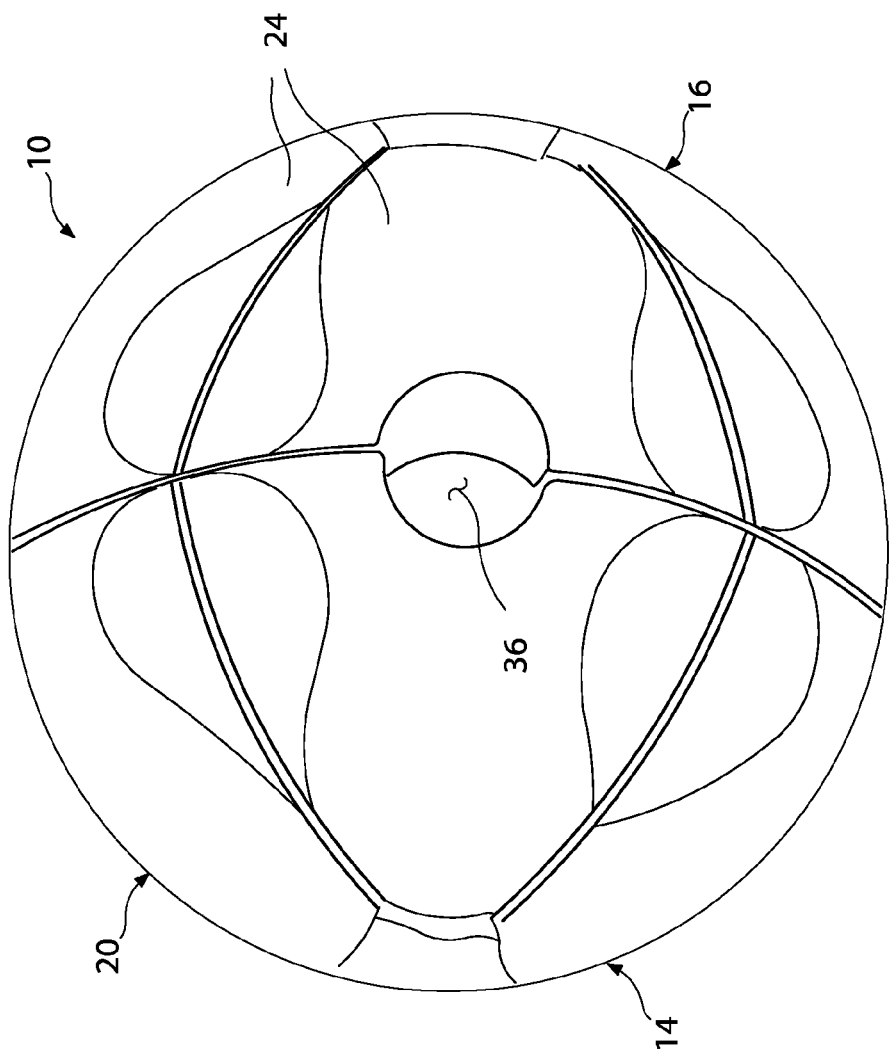
FIG. 2 is a perspective view of the chew toy assembly of FIG. 1 shown in a ball configuration.

Referring to FIG. 1 and FIG. 2, the same chew toy 10 is shown in two configurations. It should be understood that the chew toy 10 can be selectively converted into either of the shown configurations. In FIG. 1, the chew toy 10 is configured in a bone configuration 18. In FIG. 2, the chew toy 10 is configured in a ball configuration 20.

Figure 3:
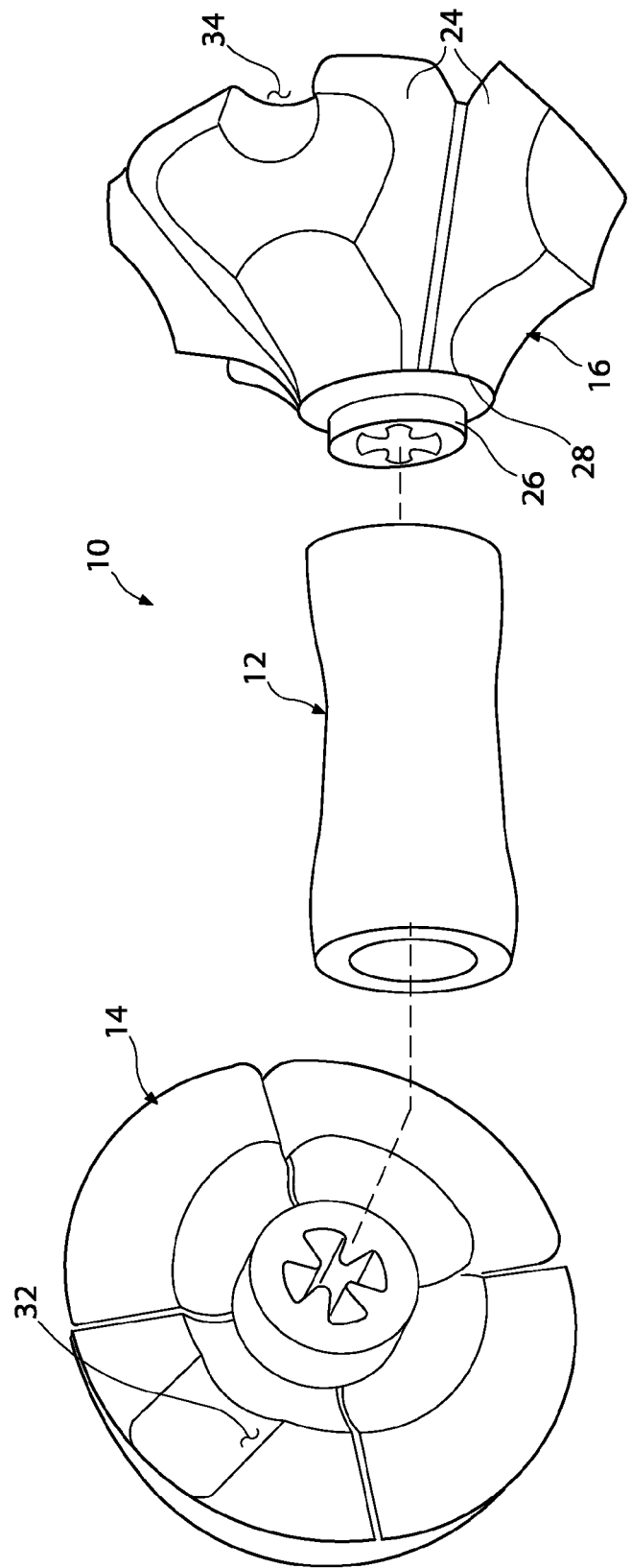
FIG. 3 is an exploded view of the chew toy assembly having invertible structures in two opposing configurations.

Referring now to FIG. 3, in conjunction with FIG. 1 and FIG. 2, it will be understood that the chew toy 10 is comprised of a central tubular body 12 and two invertible structures 14, 16 that attach to either side of the tubular body 12. The two invertible structures 14, 16 are identical. Each invertible structure 14, 16 has a hemispherical shape. However, each invertible structure 14, 16 is capable of being configured into a funnel shape by physical inversion.

When both the invertible structures 14, 16 are in their hemispherical shape, the two invertible structures 14, 16 abut and create the spherical ball configuration 20 shown in FIG. 2. The ball configuration 20 defines an interior space 22. The length of the tubular body 12 is equal to the diameter of the interior space 22. Accordingly, once the chew toy 10 is manipulated into its ball configuration 20, the tubular body 12 is not visible because it is completely enveloped within the interior space 22.

Conversely, when the invertible structures 14, 16 are inverted into their bone configuration 18, the invertible structures 14, 16 take on a funnel space and diverge away from opposite ends of the tubular body 12. The tubular body 12 is therefore visible and the tubular body 12 takes on the appearance of the center of a bone, while the invertible structures 14, 16 form the shape of bone joints at opposite ends of a bone.

The invertible structures 14, 16 are comprised of a plurality of curved sections 24 of thick plastic or elastomeric material. This makes each of the curved sections 24 resistant to damage from the teeth of a gnawing dog. Each of the curved sections 24 is affixed to a central hub 26 along hinged lines 28 made by a thinning of the plastic. Likewise, each of the curved sections 24 is affixed to adjacent curved sections 24 by thinned segments 30 of plastic.

As has been previously stated, the invertible structures 14, 16 are stable in two configurations. When folded inwardly toward the tubular body 12, the curved sections 24 of each invertible structure 14, 16 come together in a stable formation that produces a hemispherical shape. When inverted, the curved sections 24 come together in a stable formation that creates a generally funnel shaped configuration. At all other manipulated shapes, the invertible structures 14, 16 are unstable and will resort to either the hemispherical shape or the funnel shape.

Optional reliefs 32, 34 are formed through at least one of the curved sections 24 in each of the invertible structures 14, 16. The reliefs 32, 34 align when the chew toy 10 is in its ball configuration 20, such as is shown in FIG. 2. The reliefs 32, 34, therefore, define an opening 36 that provides access into the interior space 22 of the chew toy 10 when in its ball configuration 20.

Figure 4:
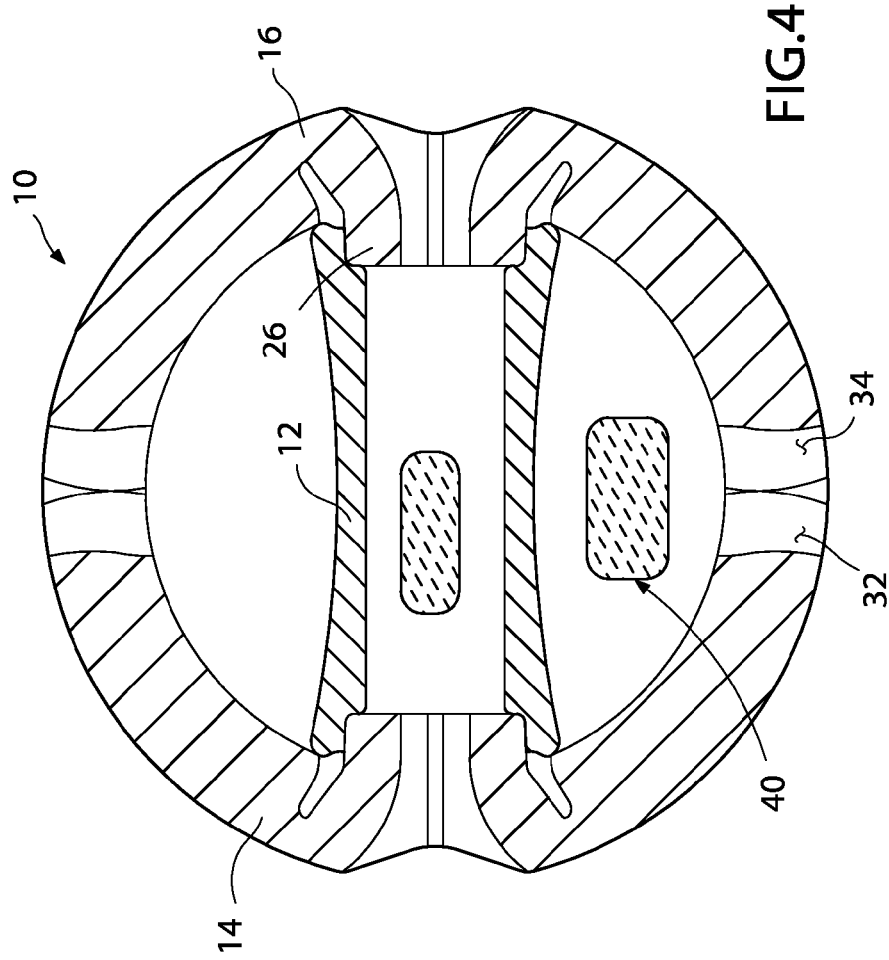
FIG. 4 is a cross-sectional view of the chew toy assembly in its ball configuration.

Referring now to FIG. 4, it can be seen that an edible treat 40 can be inserted into the interior space 22 of the ball configuration 20 through the opening 36. Once an edible treat 40 is inserted inside the chew toy 10, a dog cannot directly access the edible treat 40. However, a dog can easily smell the treat through the various open seams and the reliefs 32, 34 embodied by the chew toy 10.

As a dog tries to access the edible treat 40, the dog will bite and pull at the various invertible structures 14, 16. After an extended while, a dog may succeed in flipping one of the invertible structures 14, 16, thereby exposing the edible treat.

The tubular body 12 of the chew toy 10 can be made hollow. An access opening 42 can be formed through the central hubs 26 of each invertible structure 14, 16. The access opening 42 enables an edible treat 40 to be inserted into the interior of the tubular body 12. If an edible treat 40 is inserted into the tubular body 12 of the chew toy 10, it can only be removed by a dog chewing on the tubular body 12 and pummeling the treat 40. Once pummeled, the dog treat 40 will crumble to pieces small enough to exit the chew toy 10 as the chew toy 10 is manipulated. Accordingly, by placing an edible treat 42 into the tubular body 12, a dog will most likely continue to chew on the chew toy 10, even when the chew toy 10 is in its bone configuration.

It will be understood that the embodiment of the present invention being illustrated and described is merely exemplary and that a person skilled in the art can make many variations to that embodiment. For instance, the ball configuration can be oblong in shape, such as a football, rather than spherical. Likewise, any number of curved sections can be used to create the invertible structures. All such embodiments are intended to be included within the scope of the present invention as defined by the claims.

What is claimed is:

1. A chew toy assembly for a pet comprising:
   a body having opposite ends; and
   two invertible structures coupled to said opposite ends of said body, each of said invertible structures having a central hub and a plurality of curved panels that extend from said central hub,
   wherein said hub and said plurality of curved panels for each of said invertible structures are molded as a single unistructurally unit from elastomeric material, and
   wherein each of said invertible structures is stable in shape only in a first hemispherical configuration and a second inverted configuration,
   wherein said plurality of curved panels of said invertible structures create a spherical shape around said body when in said first hemispherical configuration and
   wherein said plurality of curved panels of said invertible structures create funnel shapes that extend away from said opposite ends of said body when in said second inverted configuration.

2. The assembly according to claim 1, wherein said two invertible structures abut when in said first hemispherical configuration, therein defining an internal area confined by said invertible structures.

3. The assembly according to claim 2, wherein said body is disposed within said internal area when said invertible structures are each in said first hemispherical configuration.

4. The assembly according to claim 1, wherein said invertible structures produce said spherical shape when each of said invertible structures are in said first hemispherical configuration, wherein said spherical shape has a predetermined diameter.

5. The assembly according to claim 4, wherein said body has a length generally equivalent to said predetermined diameter.

6. The assembly according to claim 2, wherein each of said invertible structures define at least one opening for accessing said internal area.

7. The assembly according to claim 2, further including a piece of edible material that is free moving within said internal area.

8. The assembly according to claim 1, wherein said body is tubular and defines an open interior.

9. The assembly according to claim 8, further including a piece of edible material disposed within said open interior of said body.

10. A chew toy assembly that is selectively convertible between a ball configuration and a bone configuration, said assembly comprising:
    two invertible structures, each of said invertible structures being stable in shape only when configured in a hemispherical shape and a funnel shape by physical manipulation, wherein each of said invertible structures has a central hub and a plurality of curved panels that extend from said central hub, wherein said hub and said plurality of curved panels for each of said invertible structures are unistructurally molded as a single piece;
    an elongated body interconnecting each said central hub of each of said invertible structures, wherein when said invertible structures are in said hemispherical shape, said invertible structures form said ball configuration around said elongated body, and wherein when said invertible structures are in said funnel shape, said invertible structures diverge away from said elongated body in opposite directions, therein forming said bone configuration.

11. The assembly according to claim 10, wherein said chew toy assembly defines an interior area when in said ball configuration.

12. The assembly according to claim 11, further including an access opening in at least one of said invertible structures for accessing said interior area.

13. The assembly according to claim 10, wherein said elongated body is tubular and defines an internal conduit.

14. The assembly according to claim 13, further including at least one access opening for accessing said internal conduit.

\* \* \* \* \*